United States Patent
Littlefield

[15] 3,695,213
[45] Oct. 3, 1972

[54] TRAILER LOADING TESTER AND HITCH

[72] Inventor: John C. Littlefield, 11505 E. Bannister Road, Kansas City, Mo. 64134

[22] Filed: Sept. 30, 1970

[21] Appl. No.: 76,753

[52] U.S. Cl. ............... 116/28, 116/114, 177/136, 280/489
[51] Int. Cl. ............................................. B60q
[58] Field of Search ............. 116/28, 114; 33/46 AS; 177/137–142, 136; 280/186, 187, 417, 432, 446, 489, 511, 512, 486, 489, 410

[56] References Cited

UNITED STATES PATENTS

| | | | |
|---|---|---|---|
| 2,855,222 | 10/1958 | Bolmes et al. | 280/512 |
| 3,130,993 | 4/1964 | McCleary | 280/512 X |
| 3,180,657 | 4/1965 | Molter, Sr. | 280/489 |
| 3,190,383 | 6/1965 | Fountain | 177/137 |
| 3,239,242 | 3/1966 | Adams | 280/489 |
| 3,342,509 | 9/1967 | Sancioni | 280/489 |
| 3,414,294 | 12/1968 | Moulton | 280/489 |
| 3,534,981 | 10/1970 | Moulton | 280/489 X |

FOREIGN PATENTS OR APPLICATIONS

| | | | |
|---|---|---|---|
| 1,385,527 | 12/1964 | France | 280/512 |

*Primary Examiner*—Louis J. Capozi
*Attorney*—Don M. Bradley

[57] ABSTRACT

A connection for a tailer to indicate an improper load from the trailer tongue on the hitch of the towing vehicle comprising a pair of relatively movable members adapted for coupling with the trailer tongue and towing vehicle respectively. A spring is interposed between the members to resist relative movement therebetween resulting from the load. Indicia on the members visually indicate the relative positions of the members corresponding to the proper load. A manually operable clamp cooperates with an abutment on one member disposed to engaged by the other member for releasably securing the members together as a unit against the bias of the spring for normal towing operations.

10 Claims, 7 Drawing Figures

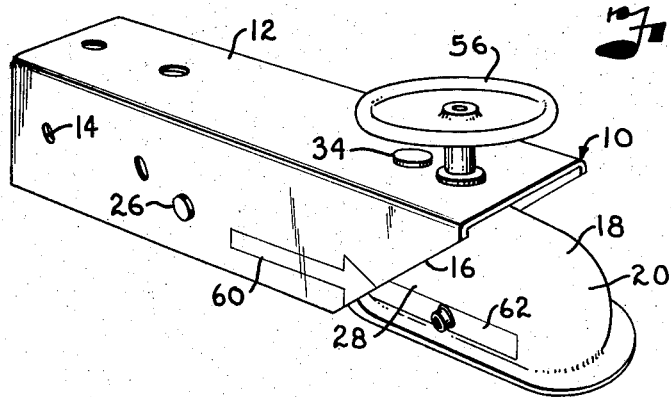
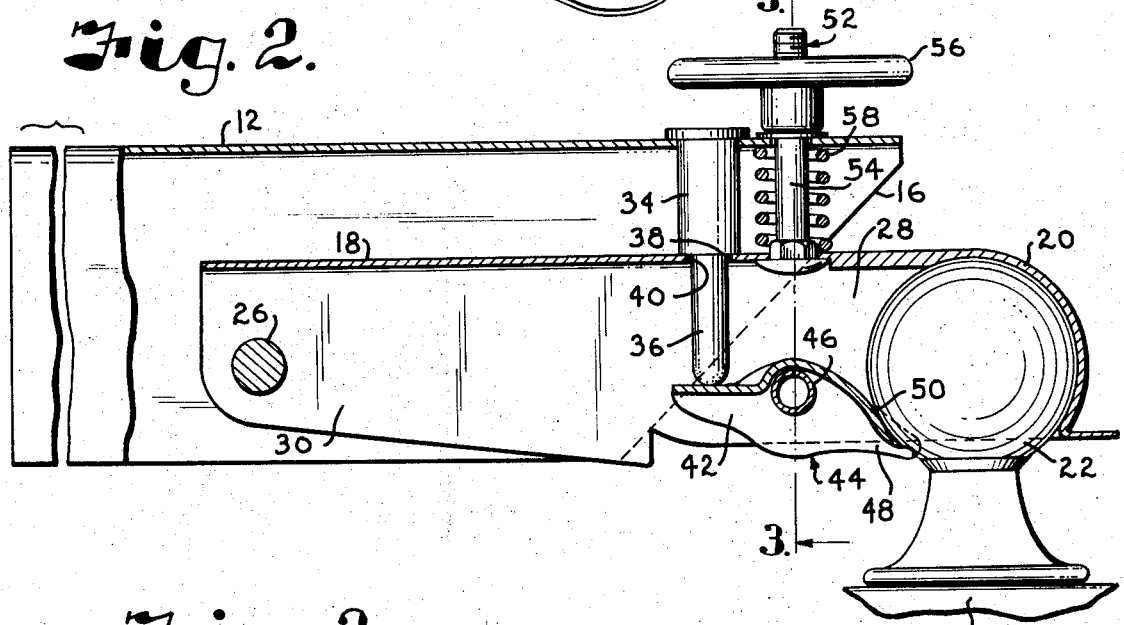
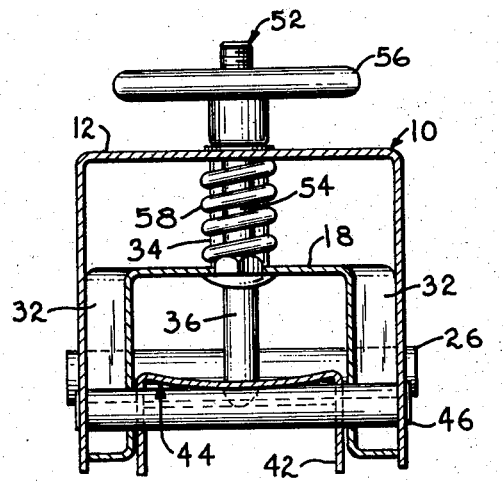
INVENTOR.
John C. Littlefield
BY Don M. Bradley
Attorney

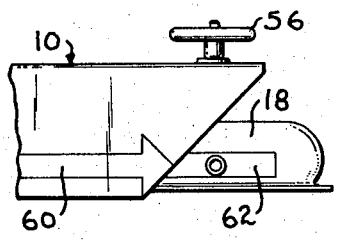
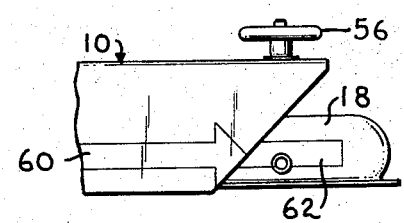
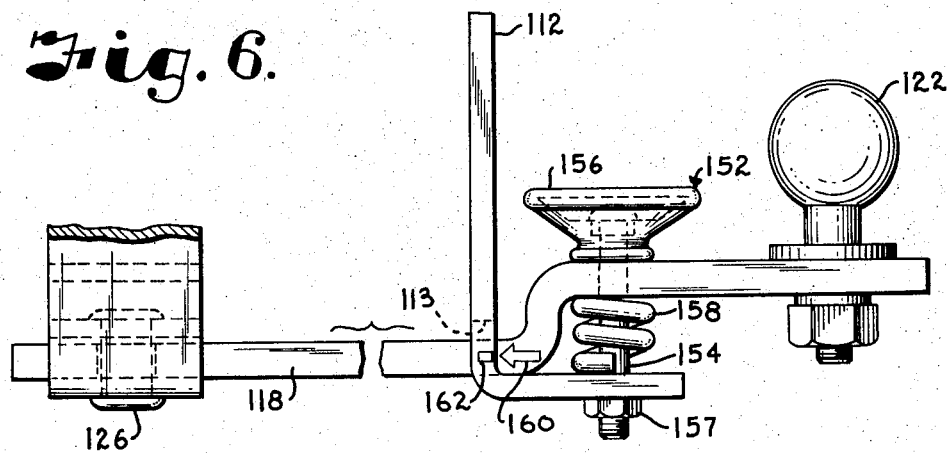
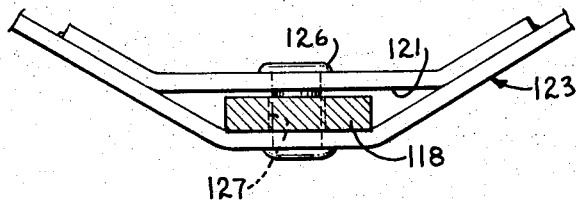
INVENTOR.
John C. Littlefield
BY Ron M. Bradley
Attorney

I

TRAILER LOADING TESTER AND HITCH

This invention pertains to vehicles, and more particularly, to an improved connection for attaching a trailer to a towing vehicle.

A very important factor for safety in transporting a trailer over a highway is proper distribution of the trailer weight. If insufficient weight is placed on the trailer tongue or hitch, the trailer will tend to sway from side to side or "fish tail." This condition can be very hazardous, especially when the trailer is towed at relatively high speeds.

Trailers for a wide range of purposes and constructed in a correspondingly great variety of sizes and shapes have compounded this problem. It has often been difficult or impossible for the operator to visually determine the correct placement for items carried by the trailer to achieve a proper weight distribution calculated to avoid this hazardous condition. Authorities are generally agreed that approximately 10 to 15 percent of any trailer's weight, including the load weight, should be carried by the hitch. However, a proper distribution of the load which achieves this condition may appear entirely different to the operator when the items comprising the load are varied. Specialty trailers such as campers, house trailers or the like are particularly difficult for judging proper loading. They are commonly used only on occasion for recreational purposes so that the operator often remains relatively inexperienced in how the trailer load should be distributed for safe highway travel.

Accordingly, it is a primary object of this invention to provide a novel connection for a trailer which enables the operator to quickly and easily determine the correct trailer loading for safe highway operation.

Another important object of the present invention is to provide such a connection which can be relatively easily fabricated from readily available materials so as to be economically available for generally universal use either as attachments to be added to existing trailers or as a standard component provided for newly manufactured trailers.

A still further object of the present invention is to provide a connection of this type which may be quickly, easily and accurately used for indicating proper trailer loading by even inexperienced operators.

Another object of the invention is to provide such a load indicating connection having means for selectively preventing relative movement of the components so that the connection can be locked from its load indicating condition to permit use of the connection for safe over-the-road coupling between the trailer and its towing vehicle.

These and other important objects of the invention will be further explained or will be apparent from the description, claims and drawings.

In the drawings:

FIG. 1 is a perspective view of a hitch or connection embodying the principles of this invention;

FIG. 2 is an enlarged, fragmentary side elevational view of the hitch of FIG. 1, parts being broken away to reveal details of construction;

FIG. 3 is a cross-sectional view taken along line 3—3 of FIG. 2;

FIG. 4 is a fragmentary side elevational view on a reduced scale of the hitch of FIG. 1;

FIG. 5 is a view similar to FIG. 4 but showing a slightly different location for the loading indicia;

FIG. 6 is a fragmentary, side elevational view of an alternate embodiment of the invention; and FIG. 7 is a fragmentary, rear elevational view thereof showing only the connection of the hitch with the vehicle.

A connection embodying the principles of this invention is illustrated in FIGS. 1–5 and is broadly enumerated by the reference number 10. Connection 10 includes an elongated, rigid, inverted U-shaped member 12 adapted to be coupled in longitudinal extension of a tongue of a trailer (not shown). To this end, member 12 is provided with a plurality of holes 14 suitable for rigidly attaching the member to the trailer tongue.

The sides of member 12 at the front end of the latter are cut away to present diagonally extending edges 16 to provide access clearance for the projecting end of an elongated, rigid member or connector 18 telescoped partially into the frame member 12 between the side walls thereof as illustrated best in FIG. 2. The projecting end of member 18 is configured to present a socket 20 adapted to complementally engage the outer surface of a generally spherical ball 22 to conjointly define with the ball a conventional universal joint connection between the trailer and its towing vehicle. Manifestly, ball 22 is mounted to the hitch of the towing vehicle 24 shown but fragmentarily in FIG. 2.

The end of member 18 opposite socket 20 is pivotally coupled to frame member 12 by a pin 26 extending transversely through members 12 and 18 respectively.

Referring specifically to FIG. 3, it may be seen that member 18 is also shaped generally in the form of an inverted U. The side walls 28 of member 18 projecting forwardly from member 12 are substantially narrower than the spacing between the side walls of member 12 so that the side walls merge gently into the rounded shape of socket 20. Walls 28 are, in turn, merged into side walls 30 by inclined portions 32 so that the walls 30 complementally fit immediately inside the respective side walls of member 12 with sufficient clearance to readily permit relative swinging movement of member 18 with respect to member 12 about the axis of pin 26.

The upward swinging movement of member 18 with respect to member 12 as viewed in FIG. 2 is limited by a pin 34 rigidly mounted in the bight portion of member 12 and extending downwardly therefrom. The lowermost end of pin 34 comprises a projection 36 of substantially smaller diameter than the remainder of the pin to define a downwardly facing annular shoulder 38 presenting an abutment disposed in the path of travel of member 18 for engagement by the latter. An opening 40 in the bight portion of member 18 receives projection 36 therethrough.

Projection 36 cooperates with one arm 42 of a lever 44 comprising a latch to prevent inadvertent removal of the socket 20 from ball 22. To this end, lever 44 is pivoted to member 18 by a transversely extending pin 46 and a forwardly projecting arm or lip 48 of the lever has an uppermost surface 50 generally configured to engage the ball as shown in FIG. 2 for locking the socket over the ball when the lever is in the position illustrated. Projection 36 engages arm 42 when the components are in this position so that it is impossible for lever 44 to pivot to a position permitting removal of the ball from its socket. Manifestly, when projection 36 is moved upwardly relative to member 18 as by the swinging of the latter in a clockwise direction about the axis of pin 26 as viewed in FIG. 2, arm 42 is released by projection 36 to permit clockwise pivoting of the lever about pin 46. This, of course, moves surface 50 to permit insertion or removal of the ball from its socket.

Means for clamping member 18 against shoulder 38 to lock the members rigidly in the positions illustrated in FIG. 2 includes a clamp 52 operably coupled with members 12 and 18 respectively. Clamp 52 comprises an elongated bolt 54 extending through the bight position or member 18 and the bight portion of member 12 intermediate socket 20 and pin 26. A manually operable handwheel 56 is threadably engaged over the threaded portion of bolt 54 so that rotation of the handwheel in one direction swings member 18 in a counter-clockwise direction as viewed in FIG. 2. Rotation of the handwheel in the opposite direction permits swinging of member 18 in the opposite direction about pin 26 under the influence of the biasing force of a coil spring 58 telescoped over bolt 54 and interposed between members 12 and 18 respectively.

In operation, handwheel 56 is rotated to a position to permit member 18 to assume a position with respect to member 12 which allows lever 44 movement about its pivot point for insertion of the ball 22 into the socket 20 of the hitch. The force of spring 58 effects this relative swinging of member 18 about pin 26 so that member 18 is spaced substantially from shoulder 38. At this time the entire load applied to the tongue of the trailer and consequently to frame member 12 is carried by spring 58. The amount of such loading on the trailer tongue is therefore accurately indicated by the relative positions of members 12 and 18 as determined by the load. The strength of spring 58 is chosen to exert a force of relatively known magnitude so that the operator can determine proper loading of the trailer by the extent that the spring is compressed under the influence of the load which is applied to it. Indicia in the form of an arrow 60 and a strip 62 painted or otherwise applied to the outer surface of members 12 and 18 respectively reveal proper relative position of the two members to the operator. Thus, when the respective indicia are correctly positioned on the members, the operator is advised that the loading on the trailer tongue is insufficient until the load exerts sufficient force against the spring to bring arrow 60 into alignment with strip 62. Manifestly, the force of spring 58 maintains an indicia out of mutual alignment by swinging member 18 about its pivot 26 until the force of the load is sufficient to overcome the yieldable force of the spring to achieve this correct alignment of the members.

It is contemplated that spring 58 may be chosen to have sufficient force for holding the members out of their correctly aligned positions until at least 10 to 15 percent of the total weight to be carried by the trailer is applied to the tongue of the trailer through hitch 10.

Once the operator observes an alignment for the members indicating proper loading of the trailer, he simply turns handwheel 56 to overcome the force of spring 58 thereby clamping member 18 against shoulder 38 to resist any relative movement between the members. This not only locks the members against hazardous relative swinging movement during over the highway travel of the vehicles, but it also positions projection 36 in overlying relationship to arm 42 of lever 44 to lock the ball in the socket. The operator can recheck for correct loading should the load shift or should additional load be applied to the vehicle merely by loosening handwheel 56 to release spring 58 to exert its biasing force between members 12 and 18.

It should be noted that the novel arrangement of projection 36 and lever 44 cooperate with the remaining components of the hitch to insure that the loading indicating capabilities for the hitch are automatically available any time the components are in condition for installation of the hitch on the ball of the towing vehicle. This insures that the operator can readily check for correct loading whenever the trailer is coupled to the towing vehicle.

The indicia 60 and 62 can be aligned as shown in FIG. 4 whereby alignment of arrow 60 with strip 62 indicates the safe loading for the trailer. On the other hand, the alignment may be as illustrated in FIG. 5 wherein strip 62 is positioned on member 18 so that it reveals the unsafe condition for trailer loading. The operator is advised that the trailer of the FIG. 5 embodiment does not have sufficient weight applied to the tongue until such time as arrow 60 is moved out of alignment with strip 62. Obviously, other positions for the indicia corresponding with predetermined relative positions between members 12 and 18 could be chosen if desired. It suffices that the relative positions indicating correct loading be known by the operator.

FIGS. 6 and 7 of the drawings illustrate an alternate embodiment of the invention wherein the two relatively movable members for indicating correct trailer loading are both carried by the towing vehicle. To this end, a rigid, L-shaped member 112 is adapted to be secured to the bumper, frame or other suitable point of attachment to the towing vehicle. Member 112 has a transversely extending opening 113 which receives therethrough an elongated, generally Z-shaped member 118. The leading end of member 118 is pivotally mounted in the slot 121 of a transversely V-shaped bracket broadly designated 123. Bracket 123 is adapted to be rigidly secured to the towing vehicle.

A vertically extending pin 126 carried by bracket 123 extends through a vertically extending hole 127 in member 118 and hole 127 is sufficiently larger than the diameter of pin 126 to permit limited swinging of member 118 in a vertical plane about pin 126. Further, the vertical dimension of slot 113 is sufficiently greater than the vertical thickness of member 118 to permit this limited swinging of the latter. A spring 158 is interposed between the rearwardly extending leg 159 of member 112 and member 118 for biasing the latter upwardly with respect to leg 159. A clamp broadly designated 152 includes bolt 154 extending through member 112 and 118 respectively. The bolt is telescoped through spring 158 as shown in the drawing and includes a handwheel 156 at the upper end secured to the bolt for manual rotation of the latter. A nut 157 is rigidly secured to the lowermost surface of leg 159 and cooperates with the threaded portion of bolt 154 for clamping members 112 and 118 into the position illustrated in FIG. 6. Manifestly, rotation of handwheel 156 in one direction releases the clamping force effected through bolt 154 and permits spring 158 to swing member 118 upwardly as viewed in the drawing. A ball 122 is carried at the trailing end of member 118 and is adapted to receive the socket carried by the tongue of the trailer (not shown).

It is believed that the operation of the embodiment of the invention illustrated in FIGS. 6 and 7 will be apparent to those skilled in the art without need for detailed explanation. It suffices to say that the clamping force of clamp 152 is released to permit indication of proper trailer loading after the trailer has been coupled with the hitch. When the load imparted to member 118 through ball 122 is sufficient to overcome the force of spring 158 to bring the arrow 160 on member 118 into alignment with the strip or mark 162 on member 112, the operator knows that the trailer is properly loaded. On the other hand, should the load be insufficient to overcome the yieldable force of spring 158, the hazardous loading of the trailer is indicated to the operator by misalignment of the indicia 160 and 162.

The operator rotates handwheel 156 to clamp member 118 into firm engagement with the abutment defined by lowermost edge of opening 113 after the load indicating function of the hitch has been utilized. This clamps the components against relative movement for safe operation of the trailer.

Having thus described the invention, what is claimed as new and desired to be secured by Letters Patent is:

1. A load indicating connection between a pair of vehicles wherein a portion of the load of one vehicle is transmitted through the connection to the other vehicle, said connection comprising:
   a pair of rigid members;
   means mounting said members for relative movement with respect to one another, one of said members being adapted for coupling with said one vehicle and the other member being adapted for coupling with the other vehicle, said members being mounted so that the load from the one vehicle causes said relative movement between the members;
   spring means interposed between the members in disposition to yieldably resist said relative movement so that the magnitude of the load determines the extent of said relative movement between the members resulting from the load overcoming the force of said spring means;
   and means disposed on one of said members for visually indicating the extent of said relative movement whereby an abserver may determine when said other vehicle has received the proper portion of the load.

2. The invention of claim 1, wherein said mounting means includes means pivotally interconnecting the members for swinging movement of said one member with respect to the other member.

3. The invention of claim 2, wherein is included manually operable structure operably coupled with said members respectively for rigidly interconnecting the members during normal towing of the one vehicle by the other.

4. The invention of claim 3, wherein said manually operable structure includes an abutment carried by one of the members and engageable by the other member to limit said relative swinging movement of the members in one direction, and clamp means operably coupled with said members respectively for clamping said members from relative movement in the opposite direction.

5. The invention of claim 4, wherein said spring means is interposed between said members for urging said relative swinging movement in said direction opposite the direction of the clamping force of the clamp means.

6. A hitch for a trailer of the type wherein a portion of the trailer load is transmitted through the tongue to a trailer vehicle, said hitch comprising:
   an elongated, rigid frame member adapted for rigid attachment to the trailer tongue in longitudinal extension thereof;
   an elongated, rigid connector adapted for pivotal connection at one end thereof to said towing vehicle;
   means pivotally attaching the connector to the frame member for swinging relative to the latter about an axis spaced from the point of pivoting of the connector with respect to the towing vehicle; and
   spring means interposed between the connector and the frame member in disposition for yieldably resisting relative movement between the connector and the frame member under said load, so that the magnitude of the load on the trailer tongue determines the extent of said movement against the force of said spring means;
   and means disposed on one of said frame member and said rigid connector for visually indicating the extent of said relative movement whereby an observer may determine when said vehicle has received the proper portion of the load.

7. The invention of claim 6, wherein the visual indicating means comprises indicia on the frame member and on the connector respectively in disposition for visually indicating the extent of swinging of the connector with respect to the frame member.

8. The invention of claim 6, wherein is included a stop carried by the frame member and disposed in the path of swinging movement of the connector to limit said swinging movement, and manually operable means connected with the frame member and the connector for releasably holding the latter against said stop whereby to selectively preclude said relative swinging movement between the frame member and the connector.

9. The invention of claim 8, wherein said connector includes a socket adapted for coupling with a ball towing element to conjointly form a universal joint at the connection between the hitch and towing vehicle, a lever pivotally coupled to the connector and disposed to cooperate with the socket for releasably securing the latter against inadvertent removal of the socket from the element, and a projection integral with the stop and extending into the path of pivoting of the lever to limit the pivoting of the latter when the connector is held against the stop.

10. The invention of claim 9, wherein said manually operable means includes a clamp operably coupled with the connector and the frame member respectively.

* * * * *